United States Patent
Choi et al.

(10) Patent No.: US 9,615,286 B2
(45) Date of Patent: Apr. 4, 2017

(54) METHOD AND APPARATUS FOR ACCESSING CHANNEL IN WLAN SYSTEM

(71) Applicant: LG Electronics Inc., Seoul (KR)

(72) Inventors: Jinsoo Choi, Anyang-si (KR); Seunghee Han, Anyang-si (KR); Jinsam Kwak, Anyang-si (KR); Yongho Seok, Anyang-si (KR); Jeongki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 14/389,953

(22) PCT Filed: Apr. 2, 2013

(86) PCT No.: PCT/KR2013/002736
§ 371 (c)(1),
(2) Date: Oct. 1, 2014

(87) PCT Pub. No.: WO2013/151311
PCT Pub. Date: Oct. 10, 2013

(65) Prior Publication Data
US 2015/0334592 A1    Nov. 19, 2015

Related U.S. Application Data

(60) Provisional application No. 61/618,852, filed on Apr. 2, 2012.

(51) Int. Cl.
*H04W 28/02* (2009.01)
*H04W 52/02* (2009.01)
(Continued)

(52) U.S. Cl.
CPC ....... *H04W 28/0221* (2013.01); *H04W 4/005* (2013.01); *H04W 52/0216* (2013.01);
(Continued)

(58) Field of Classification Search
None
See application file for complete search history.

(56) References Cited

U.S. PATENT DOCUMENTS 9,226,233 B2 *  12/2015  Liu ............... H04W 52/0216
2006/0039345 A1  2/2006  Perez-Costa
(Continued)

FOREIGN PATENT DOCUMENTS

EP     1 695 491 B1       3/2012
KR   10-2009-0034909 A    4/2009

*Primary Examiner* — Robert C Scheibel
(74) *Attorney, Agent, or Firm* — Dentons US LLP

(57) ABSTRACT

The present invention relates to a wireless communication system, and more specifically, disclosed are a method and an apparatus for accessing a channel in a WLAN system. A method for accessing the channel from a station (STA) in the wireless communication system, according to one embodiment of the present invention, comprises a step of transmitting a power save-poll (PS-poll) for channel accessing from a listening interval to an access point, wherein the station operates in a non-traffic indication map (TIM) mode which is not limited by a TIM element that is transmitted from the access point, and wherein the time of transmission of the PS-poll is not limited by the TIM element.

12 Claims, 21 Drawing Sheets

(51) Int. Cl.
*H04W 4/00* (2009.01)
*H04W 74/08* (2009.01)
*H04W 84/12* (2009.01)
*H04W 74/00* (2009.01)

(52) U.S. Cl.
CPC ...... *H04W 74/0816* (2013.01); *H04W 74/006* (2013.01); *H04W 84/12* (2013.01); *Y02B 60/50* (2013.01)

(56) References Cited

U.S. PATENT DOCUMENTS

| | | | |
|---|---|---|---|
| 2007/0086471 A1 | 4/2007 | Igarashi et al. | |
| 2007/0297438 A1 | 12/2007 | Meylan et al. | |
| 2009/0186619 A1* | 7/2009 | Yu | H04W 52/0216 455/445 |
| 2010/0214942 A1* | 8/2010 | Du | H04L 43/0876 370/252 |
| 2010/0278088 A1* | 11/2010 | Goldman | H04L 1/1671 370/311 |
| 2012/0263086 A1* | 10/2012 | Liu | H04W 52/0216 370/311 |
| 2013/0128867 A1* | 5/2013 | Calcev | H04W 72/042 370/336 |
| 2013/0188541 A1* | 7/2013 | Fischer | H04W 52/0229 370/311 |
| 2013/0235773 A1* | 9/2013 | Wang | H04W 52/0206 370/311 |
| 2015/0036572 A1* | 2/2015 | Seok | H04W 52/0206 370/311 |
| 2015/0173012 A1* | 6/2015 | Seok | H04W 52/0206 370/311 |

* cited by examiner

METHOD AND APPARATUS FOR ACCESSING CHANNEL IN WLAN SYSTEM

This Application is a 35 U.S.C. §371 National Stage entry of International Application No. PCT/KR2013/002736, filed Apr. 2, 2013, which claims benefit of Provisional Application No. 61/618,852 filed Apr. 2, 2012, all of which are incorporated by reference in their entirety herein.

TECHNICAL FIELD

The present invention relates to a wireless communication system and, more particularly, to a method and apparatus for accessing a channel in a listening interval in a WLAN system.

BACKGROUND ART

With recent development of information communication technologies, a variety of wireless communication technologies have been developed. From among such technologies, WLAN is a technology that allows wireless access to the Internet at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed greater than or equal to 540 Mbps. In addition, Multiple Input and Multiple Output (MIMO) technology, which employs multiple antennas for both a transmitter and a receiver in order to minimize transmission errors and to optimize a data rate, has been introduced.

DISCLOSURE

Technical Problem

Machine-to-machine (M2M) communication technology has been discussed as a next generation communication technology. Technical standards to support M2M communications in the IEEE 802.11 WLAN system are also under development as IEEE 802.11ah. In M2M communication, a scenario in which occasional transmission/reception of a small amount of data at a low speed in an environment including a large number of devices may be considered.

Communication in the WLAN system is performed on a medium shared by all devices. If the number of devices increases as in the case of M2M communication, consumption of a lot of time for channel access of one device may deteriorate overall system performance and obstruct each device from saving power.

An object of the present invention devised to solve the problem lies in a new channel access method for efficiently supporting operation of a device that receives data without receiving signaling of a traffic indication map (TIM).

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for performing channel access in a station (STA) in a wireless communication system, including attempting, by the STA, channel access to an access point in a listening interval, wherein the STA is in a non-TIM mode.

In another aspect of the present invention, provided herein is a station (STA) for performing channel access in a wireless communication system including a transceiver, and a processor, wherein the processor is configured to attempt channel access to an access point in a listening interval, wherein the STA is set to a non-TIM mode.

Embodiments according to the above aspects of the present invention may include the following details in common.

A start time of the listening interval may be determined to be one of a time for the STA to transmit power management mode setting information to the access point and a time for the STA to receive a response frame in response to the setting information.

The STA may attempt the channel access without receiving a beacon frame from the access point in the listening interval.

The channel access may include transmission of a power save (PS)-Poll of the STA.

The STA may include a sensor type STA.

When transmission of the PS-Poll fails sequentially in a predetermined number of the listening intervals, the STA may perform the channel access at a prior time before the start time of the listening interval.

The prior time may be a value set through a system parameter or a value preset through a management process between the STA and the access point.

Even if the channel access is performed at a second time later than a first time corresponding to the listening interval, next channel access may be performed not at the second time but at a time passing the first time by the listening interval.

The STA may attempt the channel access at least once per listening interval.

The above general description and following detailed description of the present invention are exemplarily given to supplement the recitations in the claims.

Advantageous Effects

According to one embodiment of the present invention, a new channel access method and apparatus for efficient support of operation of a device that receives data without receiving signaling of a traffic indication map (TIM) may be provided.

The effects that can be obtained from the present invention are not limited to the aforementioned effects, and other effects may be clearly understood by those skilled in the art from the descriptions given below.

DESCRIPTION OF DRAWINGS

The accompanying drawings, which are intended to provide a further understanding of the present invention, illustrate various embodiments of the present invention and together with the descriptions in this specification serve to explain the principle of the invention.

BEST MODE

Figure 1:
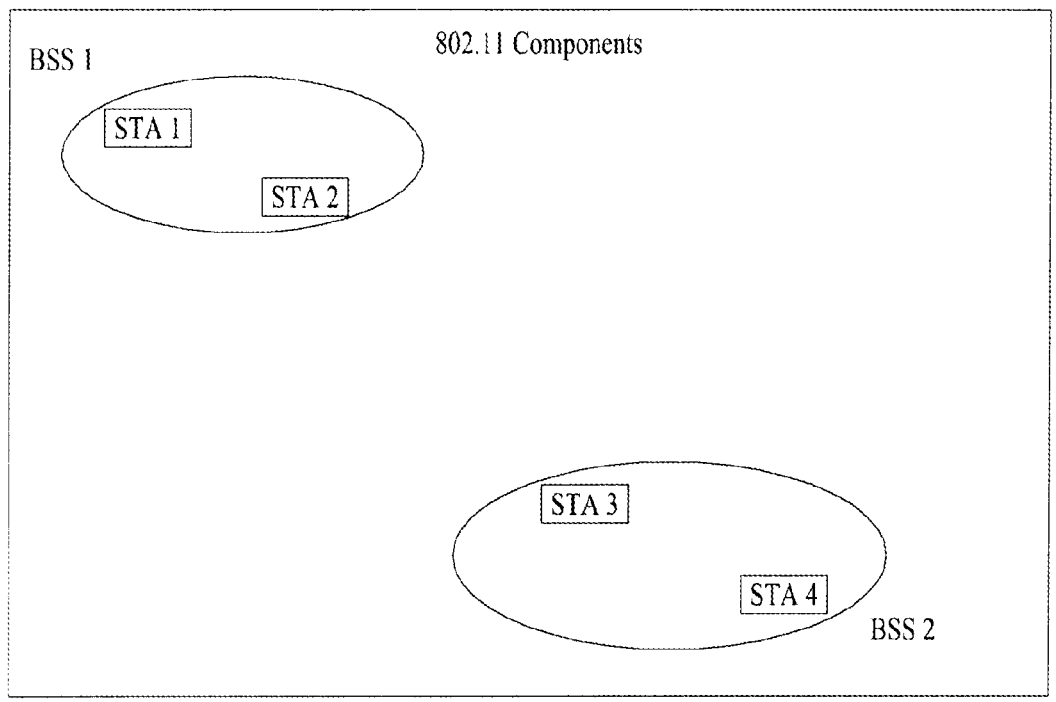
FIG. 1 is a diagram showing an exemplary structure of an IEEE 802.11 system to which the present invention is applicable.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to present all the embodiments that can be implemented according to the invention. The following detailed description includes specific details in order to provide a thorough understanding of the present invention. However, it will be apparent to those skilled in the art that the present invention may be practiced without such specific details.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Specific terms are employed in the following description for better understanding of the present invention. Such specific terms may take other forms within the technical scope or spirit of the present invention.

In some cases, well-known structures and devices are omitted in order to avoid obscuring the concepts of the present invention and important functions of the structures and devices may be mainly illustrated in the form of block diagrams.

Exemplary embodiments of the present invention are supported by standard documents disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system, which are wireless access systems. That is, steps or parts which are not described to clearly reveal the technical spirit of the present invention in the embodiments of the present invention may be supported by the above documents. All terminology used herein may be supported by at least one of the aforementioned documents.

The following embodiments of the present invention can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be embodied through a radio technology such as UTRA (Universal Terrestrial Radio Access) or CDMA2000. TDMA may be embodied through radio technologies such as GSM (Global System for Mobile communication)/GPRS (General Packet Radio Service)/EDGE (Enhanced Data Rates for GSM Evolution). OFDMA may be embodied through radio technologies such as IEEE 802.11 (Wi-Fi), IEEE 802.16 (WiMAX), IEEE 802.20, and E-UTRA (Evolved UTRA). For clarity, the following description mainly focuses on IEEE 802.11 systems, but technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent STA mobility for a higher layer may be provided by interaction between components. A Basic Service Set (BSS) may correspond to a basic component block in an IEEE 802.11 LAN. In FIG. 1, two BSSs (BSS1 and BSS2) are shown and each of the BSSs includes two STAs as members thereof (i.e., STA1 and STA2 are included in BSS1, and STA3 and STA4 are included in BSS2). In FIG. 1, an ellipse indicating each BSS may be understood as a coverage area in which STAs included in the BSS maintain communication. This area may be referred to as a basic service area (BSA). If an STA moves out of the BSA, the STA cannot directly communicate with the other STAs within the BSA.

In the IEEE 802.11 LAN, the most basic type of BSS is an independent BSS (IBSS). For example, the IBSS may have a minimal form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. This type of LAN may be configured when the LAN is necessary, rather than being prescheduled. This network may be referred to as an ad-hoc network.

Memberships of an STA in a BSS may be dynamically changed depending on whether the STA is switched on or off and whether the STA enters or leaves the BSS area. The STA may use a synchronization process to join the BSS to be a member of the BSS. To access all services of a BSS infrastructure, the STA should be associated with the BSS. Such association may be dynamically established and may involve use of a distribution system service (DSS).

Figure 2:
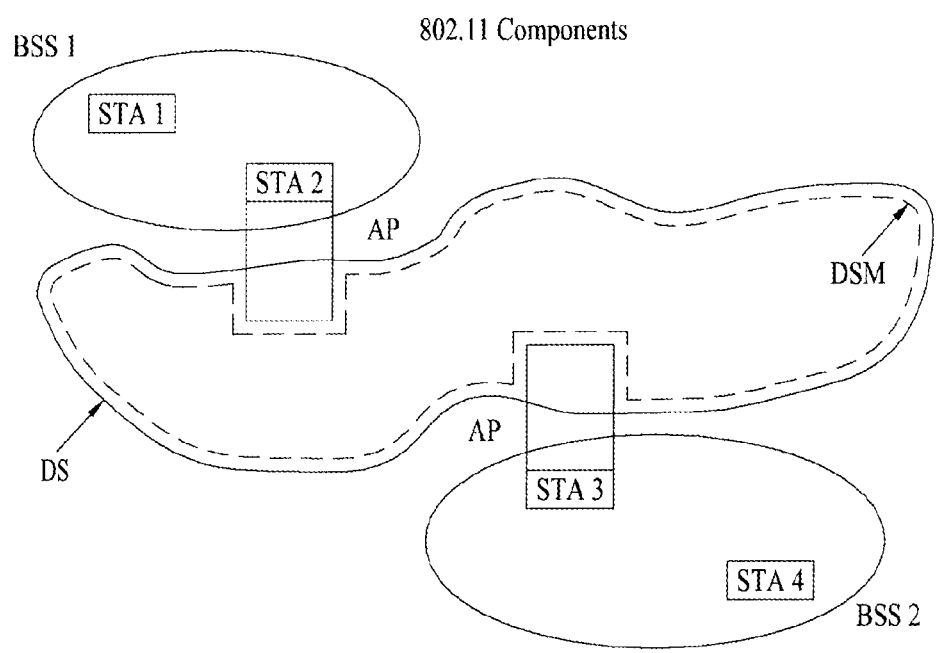
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be limited by physical layer (PHY) performance. In some cases, such limited distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network including a plurality of BSSs, rather than being independently present as shown in FIG. 1.

The DS is a logical concept and may be specified by the characteristics of the DSM. In this regard, a wireless medium (WM) and the DSM are logically distinguished from each other in IEEE 802.11. Respective logical media are used for different purposes and are used by different components. According to IEEE 802.11, such media are not restricted to either the same or different media. The flexibility of the IEEE 802.11 LAN architecture (DS architecture or other network architectures) can be explained by the fact that plural media are logically different from each other. That is, the IEEE 802.11 LAN architecture can be implemented in various manners and may be independently specified by a physical property of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs basically correspond to STAs, all APs are addressable entities. An address used by an AP for communication on the WM need not be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frames) may be transmitted to the DS.

Figure 3:
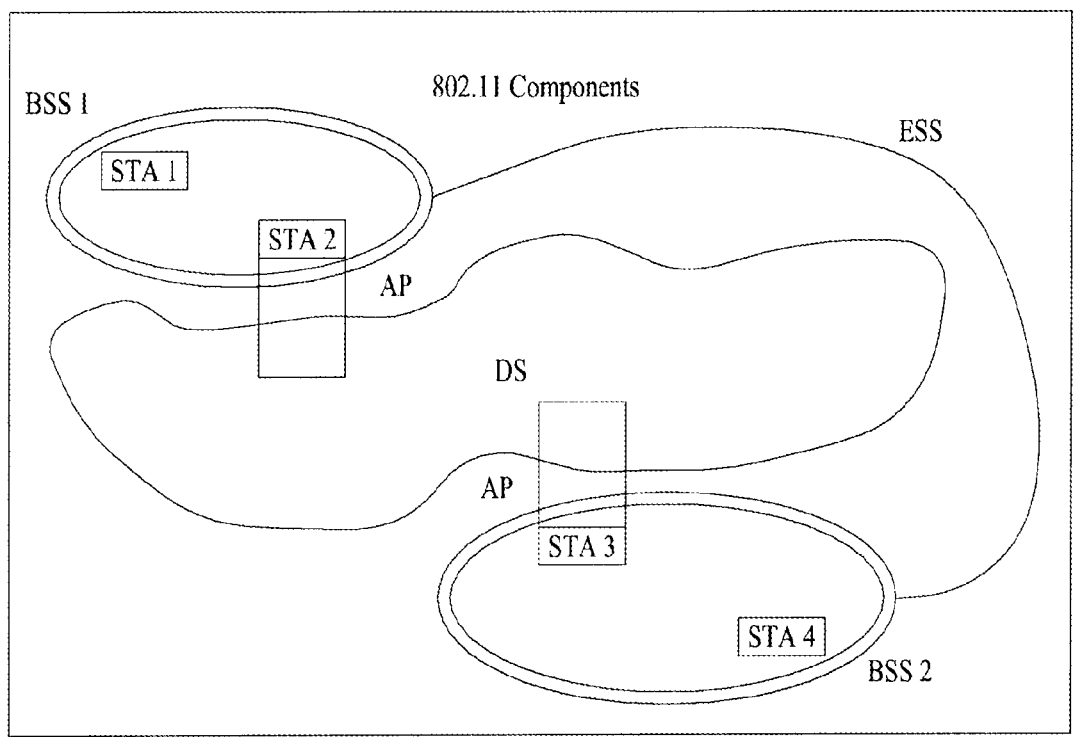
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be constructed by a DS and BSSs. In the IEEE 802.11 system, this type of network is referred to as an ESS network. The ESS may correspond to a set of BSSs connected to one DS. However, the ESS does not include the DS. The ESS network is characterized in that the ESS network is viewed as an IBSS network in a logical link control (LLC) layer. STAs included in the ESS may communicate with each other and mobile STAs are movable transparently from one BSS to another BSS (within the same ESS) in LLC.

Regarding relative physical locations of the BSSs in FIG. 3, IEEE 802.11 does not assume any arrangement, and all the following arrangements are possible. BSSs may partially overlap and this positional arrangement is generally used to provide continuous coverage. In addition, the BSSs may not be physically connected, and a distance between BSSs is not logically limited. The BSSs may be located at the same physical position and this positional arrangement may be adopted to provide redundancy. One (or at least one) IBSS or ESS network may be physically present in one space as one (or at least one) ESS network. This may correspond to an ESS network form taken in the case in which an ad-hoc network operates in a location where the ESS network is present, in the case in which IEEE 802.11 networks of different organizations physically overlap, or in the case in which two or more different access and security policies are needed in the same location.

Figure 4:
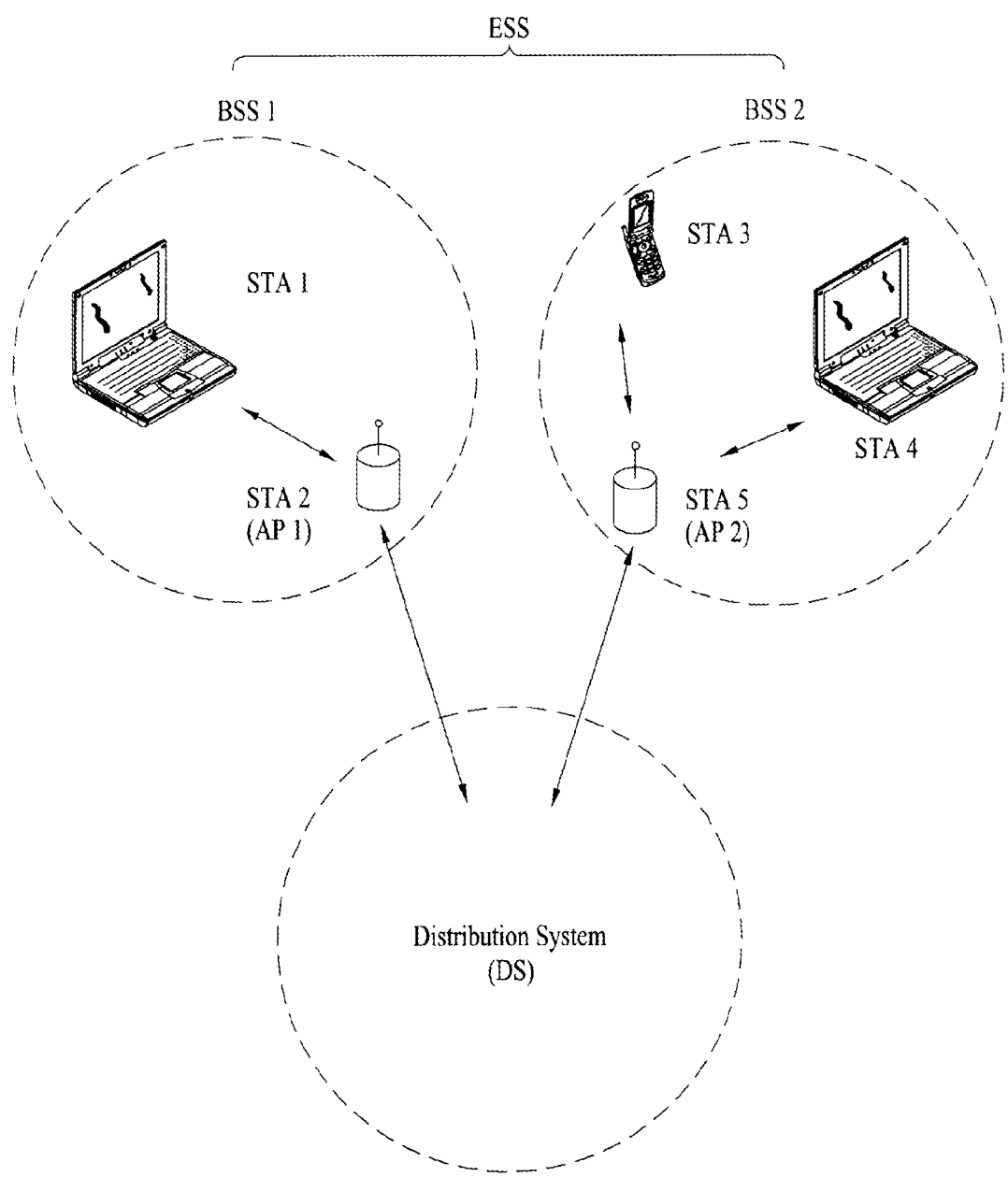
FIG. 4 is a diagram showing an exemplary structure of a WLAN system.

FIG. 4 is a diagram showing an exemplary structure of a WLAN system. FIG. 4 shows an exemplary infrastructure BSS including a DS.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices such as laptop computers or mobile phones which are generally handled directly by users. In the example of FIG. 4, STA 1, STA 3, and STA 4 correspond to the non-AP STAs and STA 2 and STA 5 correspond to AP STAs.

In the following description, the non-AP STA may be called a terminal, a wireless transmit/receive unit (WTRU), user equipment (UE), a mobile station (MS), a mobile terminal, or a mobile subscriber station (MSS). The AP is a concept corresponding to a base station (BS), a Node-B, an evolved Node-B (e-NB), a base transceiver system (BTS), or a femto BS in other wireless communication fields.

Link Setup Process

Figure 5:
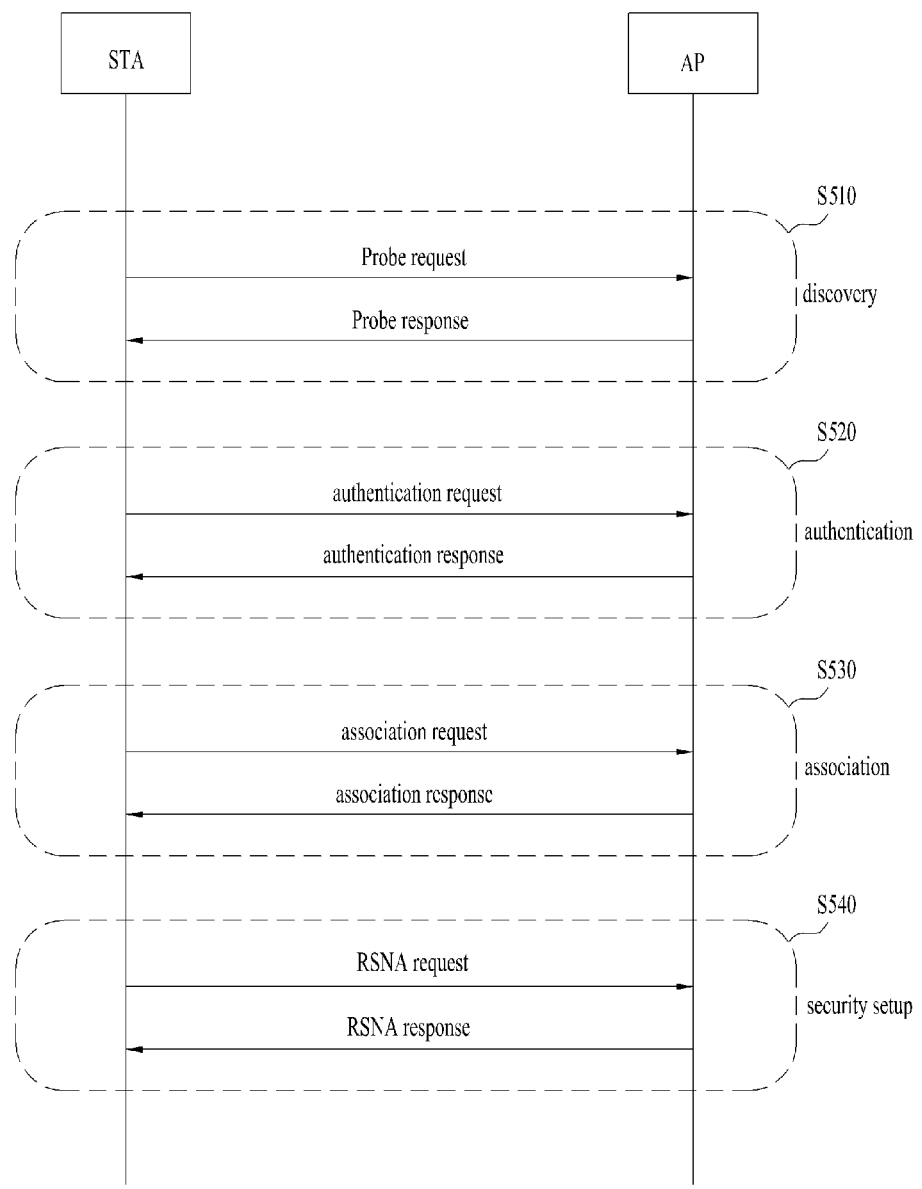
FIG. 5 illustrates a link setup process in a WLAN system.

FIG. 5 illustrates a general link setup process.

To set up a link with respect to the network and transmit/receive data over the network, the STA should perform network discovery and authentication, establish association, and perform an authentication procedure for security. The link setup process may also be referred to as a session initiation process or a session setup process. In addition, the discovery, authentication, association, and security setup steps in the link setup process may be collectively called an association step in a general sense.

Hereinafter, an exemplary link setup process will be described with reference to FIG. 5.

In step S510, an STA may perform the network discovery operation. The network discovery operation may include a scanning operation of the STA. That is, the STA needs to search for an available network so as to access the network. The STA needs to identify a compatible network before participating in a wireless network. Herein, the process of identifying a network contained in a specific region is referred to as scanning.

The scanning operation is classified into active scanning and passive scanning.

FIG. 5 exemplarily shows the network discovery operation including the active scanning process. In the case of active scanning, an STA configured to perform scanning transmits a probe request frame and waits for a response to the probe request frame, in order to move between channels and search for nearby APs. A responder transmits a probe response frame to the STA having transmitted the probe request frame, in response to the probe request frame. Herein, the responder may be the last STA that has transmitted a beacon frame in a BSS of the scanned channel. In the BSS, the AP transmits a beacon frame, and thus the AP serves as the responder. In the IBSS, STAs within the IBSS transmit a beacon frame in rotation, and thus the responder is not fixed. For example, the STA that has transmitted the probe request frame on Channel #1 and has received the probe response frame on Channel #1 may store BSS-related information that is contained in the received probe response frame and move to the next channel (for example, Channel #2) to perform scanning (i.e., transmission/reception of a probe request/response on Channel #2) in the same manner.

Although not shown in FIG. 5, scanning may be carried out in the passive scanning manner. In performing the passive scanning operation, an STA to perform scanning waits for a beacon frame while moving from one channel to another. The beacon frame, which is one of the management frames in IEEE 802.11, is periodically transmitted to inform of presence of a wireless network and to allow the STA performing scanning to find a wireless network and participate in the wireless network. In a BSS, the AP periodically transmits the beacon frame. In an IBSS, STAs of the IBSS transmit the beacon frame in rotation. When an STA performing scanning receives a beacon frame, the STA stores information about the BSS contained in the beacon frame and moves to the next channel. In this manner, the STA records beacon frame information received on each channel. The STA having received a beacon frame stores BSS-related information contained in the received beacon frame, and then moves to the next channel and performs scanning in the same manner.

In comparison between active scanning and passive scanning, active scanning is more advantageous than passive scanning in terms of delay and power consumption.

After the STA discovers the network, the STA may perform authentication in step S520. This authentication process may be referred to as first authentication, which is clearly distinguished from the security setup operation of step S540, which will be described later.

The authentication process may include transmitting, by the STA, an authentication request frame to an AP and transmitting, by the AP, an authentication response frame to the STA in response to the authentication request frame. The authentication frame used in transmitting an authentication request/response may correspond to a management frame.

The authentication frame may contain information about an authentication algorithm number, an authentication transaction sequence number, a status code, a challenge text, a robust security network (RSN), a finite cyclic group, etc. This information, which is an example of information that may be contained in the authentication request/response frame, may be replaced with other information, or include additional information.

The STA may transmit an authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S530. The association process may include the steps of transmitting, by the STA, an association request frame to the AP and transmitting, by the AP, an association response frame to the STA in response.

For example, the association request frame may include information related to various capabilities, a beacon listening interval, a service set identifier (SSID), supported rates, supported channels, RSN, mobility domain, supported operating classes, a traffic indication map (TIM) broadcast request, an interworking service capability, etc.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, etc.

The aforementioned information, which corresponds to some parts of information which can be contained in the association request/response frame, may be replaced with other information or include additional information.

The beacon listening interval indicates how often an STA in the power save mode needs to wake up to listen to a beacon management frame. The beacon listening interval may be transmitted to an AP through a Listen Interval field, which indicates the listening interval. This parameter is a listening interval parameter for MLMEASSOCIATE.request Ehsms MLME-REASSOCIATE.request primitives and may be expressed in a beacon interval unit. The length of the Listen Interval field may be set to 2 octets, but is not always set to 2 octets.

After the STA is successfully associated with the network, the security setup process may be performed in step S540. The security setup process of step S540 may be referred to as an authentication process based on a robust security network association (RSNA) request/response. The authentication process of step S520 may be referred to as a first authentication process, and the security setup process of step S540 may be simply referred to as an authentication process.

The security setup process of step S540 may include, for example, a process of performing private key setup based on 4-way handshaking through an extensible authentication protocol over LAN (EAPOL) frame. In addition, the security setup process may be performed using another security scheme that is not defined in IEEE 802.11 standards.

Evolution of WLAN

In order to overcome a limit in WLAN communication speed, IEEE 802.11n has recently been established as a communication standard. IEEE 802.11n aims to increase network speed and reliability as well as to extend wireless network coverage. More specifically, IEEE 802.11n supports a high throughput (HT) of a maximum data processing speed of 540 Mbps, and is based on multiple input multiple output (MIMO) technology in which multiple antennas are used at both a transmitter and a receiver.

With widespread use of WLAN technology and diversification of WLAN applications, there has been a need for development of a new WLAN system capable of supporting higher throughput than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at a MAC service access point (MAC SAP).

In order to efficiently utilize a radio frequency channel, the next generation WLAN system supports a Multi User Multiple Input Multiple Output (MU-MIMO) transmission scheme in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace is under discussion. For example, a technology for introducing the WLAN system in TV whitespace (TV WS) such as a frequency band (e.g., a band between 54 MHz and 698 MHz) left idle due to transition from analog TV to digital TV has been discussed under the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame when the licensed user uses this frequency band.

Accordingly, the AP and/or STA need to pre-check whether use of a specific frequency band within the WS band is possible, namely whether a licensed user is in the frequency band. Checking whether a licensed user is in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or when a DTV preamble is detected.

Machine-to-machine (M2M) communication technology has been discussed as a next generation communication technology. Technical standard IEEE 802.11ah to support M2M communication in the IEEE 802.11 WLAN system is also under development. M2M communication, which represents a communication scheme involving one or more machines, may also be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user equipment such as a smartphone which is capable of performing communication by automatically accessing the network without manipulation/intervention by the user may be an example of the machines. M2M communication may include device-to-device (D2D) communication and communication between a device and an application server. As examples of communication between a device and an application server, there may be communication between a vending machine and an application server, communication between a Point of Sale (POS) device and an application server, and communication between an electric meter, a gas meter or a water meter and an application server. M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). Accordingly, methods have been discussed to efficiently support the case in which a very small number of STAs have a data frame to receive from the AP during one beacon period while the number of STAs to be associated with one AP increases in the WLAN system.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS)), prior to data transmission. When it is determined in the sensing that the medium is in the idle state, frame transmission begins through the medium. On the other hand, when it is sensed that the medium is in the occupied state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). HCF is based on the DCF and the point coordination function (PCF). PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 6:
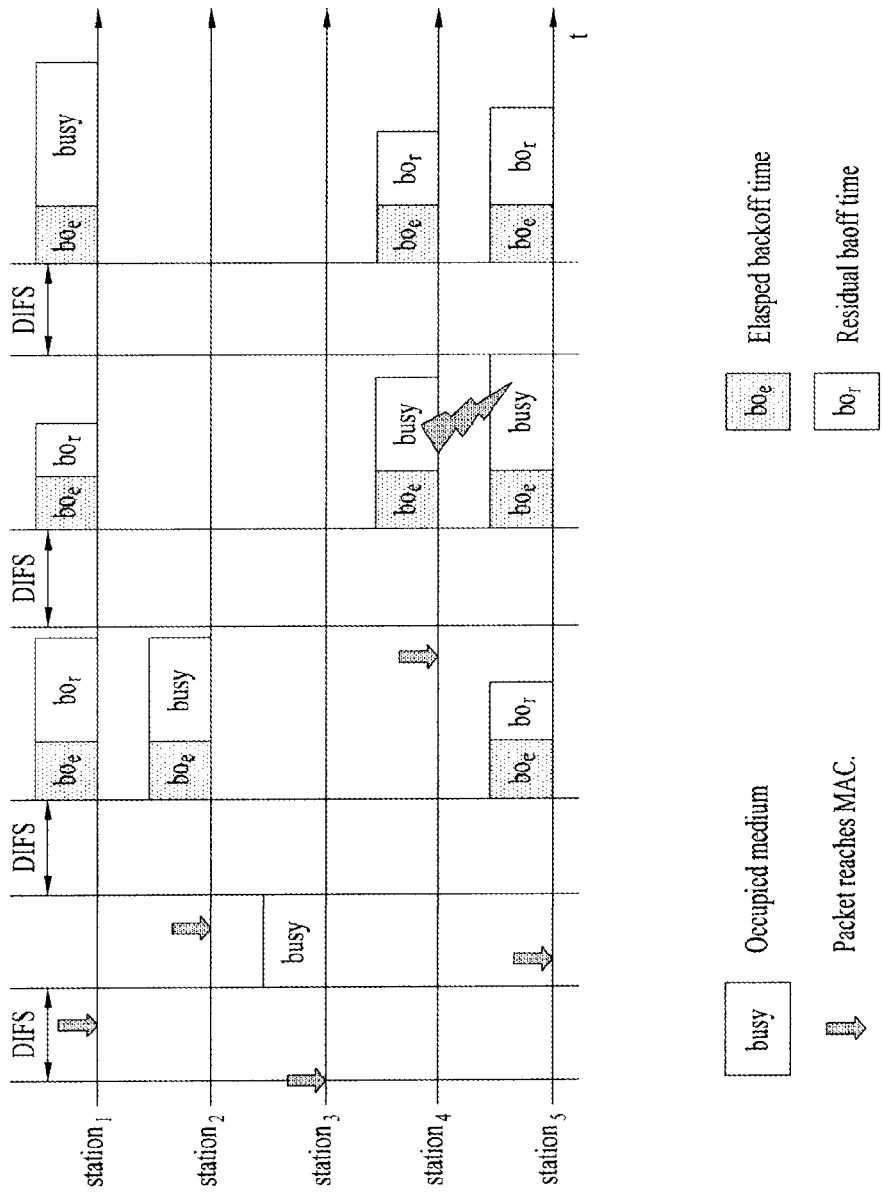
FIG. 6 illustrates a backoff process.

FIG. 6 illustrates a backoff process.

Hereinafter, operations based on a random backoff period will be described with reference to FIG. 6. If the medium is switched from the occupied or busy state to the idle state, several STAs may attempt to transmit data (or frames). In a method to minimize collisions, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin. Preferably, the values of CW, CWmin, and CWmax are set to 2n−1 (where n=0, 1, 2, . . . ).

Once the random backoff process begins, the STA continuously monitors the medium while counting down the backoff slot according to a determined backoff count value. If the medium is monitored as being in the occupied state, the STA stops the countdown and waits for a predetermined time. If the medium is in the idle state, the remaining countdown resumes.

In the example shown in FIG. 6, if a packet for STA3 to transmit reaches MAC of STA3, the STA3 may confirm that the medium is in the idle state in the DIFS and immediately transmit a frame. In the meantime, the other STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 6, STA2 selects the lowest backoff count value and STA1 selects the highest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. FIG. 6 exemplarily illustrates a case in which the residual backoff time of STA5 is equal to the random backoff count value of STA4 by chance. In this case, collision may occur between STA4 and STA5. If collision occurs between STA4 and STA5, neither STA4 nor STA5 receives ACK, and accordingly data transmission fails. In this case, each of STA4 and STA5 may double the CW value, select a random backoff count value and then perform countdown. Meanwhile, STA1 waits while the medium is in the occupied state due to transmission operation by STA4 and STA5. In this case, when the medium returns to the idle state, STA1 waits for the DIFS time, and then starts frame transmission after lapse of the residual backoff time.

Sensing Operation of STA

As described above, the CSMA/CA mechanism includes not only physical carrier sensing through which the AP and/or STA directly sense the medium, but also virtual carrier sensing. The virtual carrier sensing is performed to address some problems (such as a hidden node problem) encountered in medium access. In the virtual carrier sensing, MAC of the WLAN system may use a network allocation vector (NAV). By means of the NAV value, the AP and/or STA which is using the medium or has authority to use the medium indicates, for another AP and/or another STA, the remaining time before a time at which the medium becomes available. Accordingly, the NAV value may correspond to a reserved period during which the medium is used by the AP and/or STA to transmit a frame. An STA having received the NAV value may be prohibited from accessing the medium during the corresponding period. For example, NAV may be set according to the value of the duration field in the MAC header of a frame.

A robust collision detection mechanism has been introduced to reduce the probability of such collision. Hereinafter, this mechanism will be described with reference to FIGS. 7 and 8. The actual carrier sensing range may not be identical to the transmission range, but for simplicity of description, it will be assumed that the actual carrier sensing range is identical to the transmission range.

Figure 7:
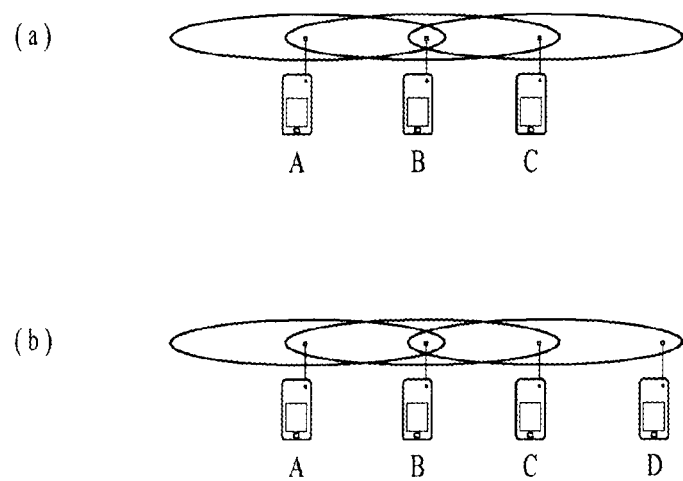
FIG. 7 illustrates a hidden node and an exposed node.

FIG. 7 illustrates a hidden node and an exposed node.

FIG. 7(a) exemplarily shows a hidden node. In FIG. 7(a), STA A communicates with STA B, and STA C has information to be transmitted. Specifically, when STA C performs carrier sensing prior to transmission of data to STA B, STA C may determine that the medium is in the idle state even in a situation in which STA A is transmitting information to STA B. This is because transmission by STA A (i.e., occupied medium) may not be sensed at the location of STA C. In this case, collision may occur since STA B receives information of STA A and information of STA C simultaneously. In this case, STA A may be considered a hidden node of STA C.

Figure 13:
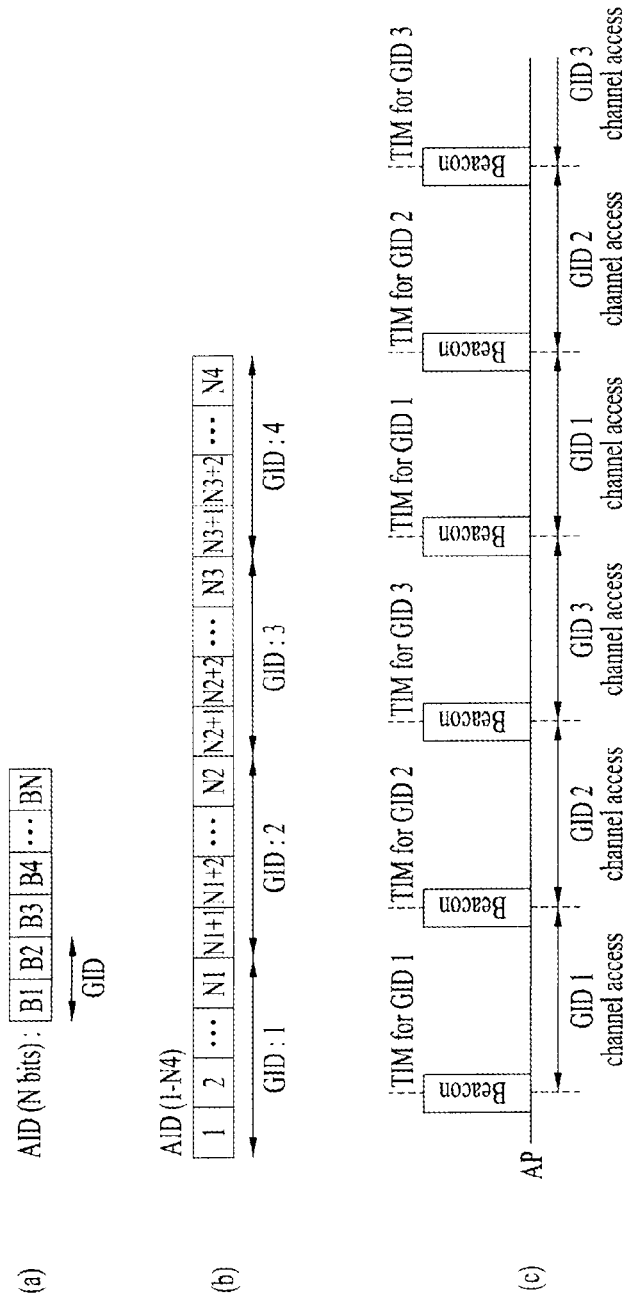
FIG. 13 illustrates a group-based AID.

FIG. 7(b) exemplarily shows an exposed node. In FIG. 13(b), STA C has information to be transmitted to STA D in a situation in which STA B is transmitting data to STA A. In this case, STA C may perform carrier sensing and determine that the medium is occupied due to transmission of STA B. Therefore, although STA C has information to be transmitted to STA D, STA C should wait until the medium switches back to the idle state since the occupied state of the medium is sensed. However, since STA A is actually located out of the transmission range of STA C, transmission from STA C may not collide with transmission from STA B in view of STA A, and STA C unnecessarily waits until STA B stops transmission. In this case, STA C may be viewed as an exposed node of STA B.

Figure 8:
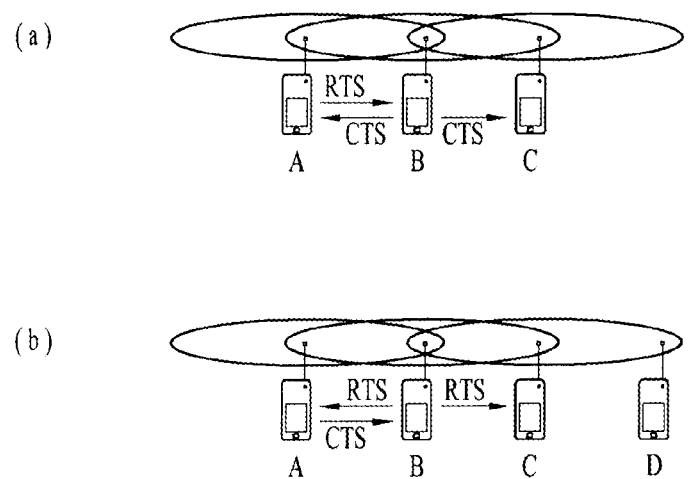
FIG. 8 illustrates RTS and CTS.

FIG. 8 illustrates RTS and CTS.

In order to efficiently use the collision avoidance mechanism in an exemplary situation as shown in FIG. 7, short-signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA that is to receive data, the STA to receive data may transmit a CTS frame to nearby STAs, thereby informing the nearby STAs that the STA is about to receive data.

FIG. 8(a) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 8(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located out of the carrier sensing range of STA C.

Power Management

As described above, STAs in the WLAN system should perform channel sensing before they perform transmission/reception operation. Persistently performing channel sensing causes persistent power consumption of the STA. There is not much difference in power consumption between the reception state and the transmission state, and continuous maintenance of the reception state may cause large load to STAs which are provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. When the STA is in the awake state, the STA may normally perform frame transmission/reception, channel scanning, or the like. On the other hand, the STA in the PS mode operates by switching between the sleep state (or doze state) and the awake state. The STA in the sleep state operates with minimum power and performs neither frame transmission/reception nor channel scanning.

As the time for which the STA operates in the sleep state increases, power consumption of the STA is reduced, and accordingly the STA operation duration increases. However, since transmission or reception of the frame is not allowed in the sleep state, the STA cannot unconditionally operate in the sleep state for a long time. When the STA operating in the sleep state has a frame to transmit to the AP, it may be switched to the awake state to transmit/receive the frame. On the other hand, when the AP has a frame to transmit to the STA which is in the sleep state, the STA cannot receive the frame nor recognize the presence of the frame. Accordingly, in order to recognize presence or absence of a frame to be transmitted to the STA (or in order to receive the frame if the frame is present), the STA may need to switch to the awake state according to specific periodicity.

Figure 9:
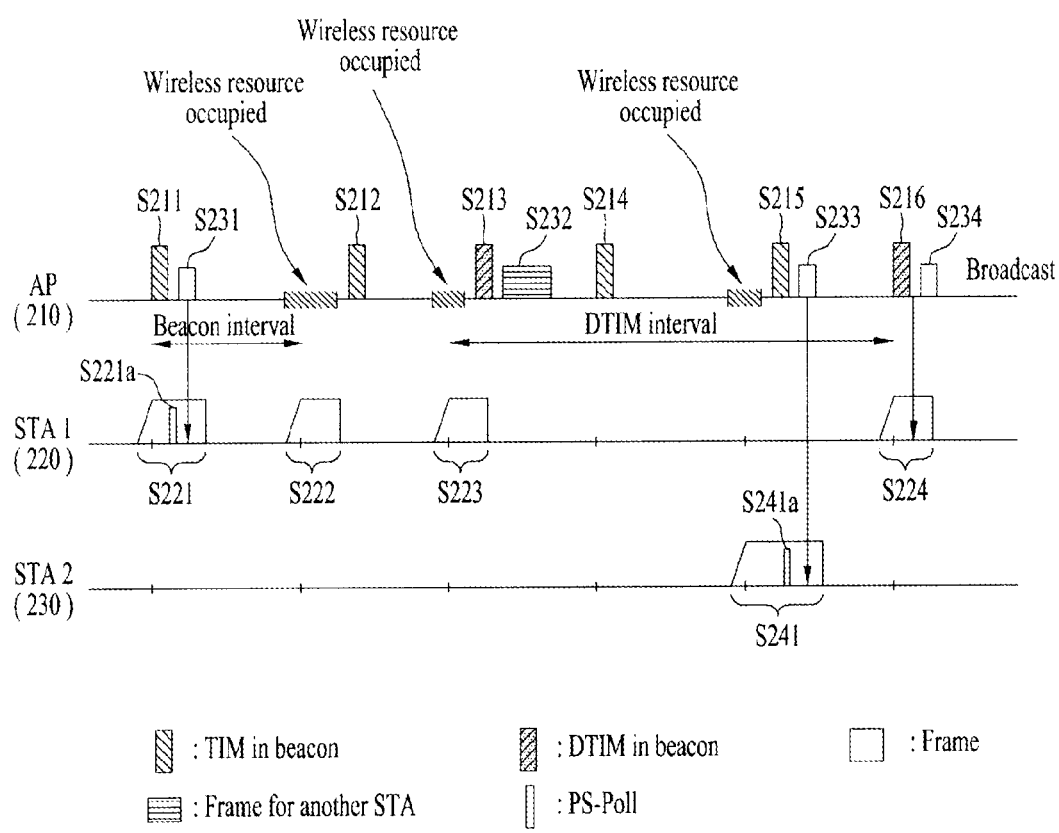
FIG. 9 illustrates a power management operation.

FIG. 9 illustrates a power management operation.

Referring to FIG. 9, AP 210 transmits a beacon frame to STAs present in the BSS at predetermined time intervals (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once per three transmissions of the beacon frame. STA1 220 and STA2 230 are STAs operating in the PS mode. Each of STA1 220 and STA2 222 may be switched from the sleep state to the awake state at every wakeup interval of a predetermined period to receive the TIM element transmitted by the AP 210. Each STA may calculate a switching time to switch to the awake state, based on its own local clock. In the example shown in FIG. 15, it is assumed that the clock of the STA coincides with that of the AP.

For example, the predetermined wakeup interval may be set in such a manner that STA1 220 can switch to the awake state at every beacon interval to receive the TIM element. Accordingly, when AP 210 transmits the beacon frame for the first time (S211), STA1 220 may switch to the awake state (S221). Thereby, STA1 220 may receive the beacon frame and acquire the TIM element. If the acquired TIM element indicates that there is a frame to be transmitted to STA1 220, STA1 220 may transmit a power save (PS)-Poll frame, which requests transmission of the frame, to the AP 210 (S221a). In response to the PS-Poll frame, the AP 210 may transmit the frame to STA 1 220 (S231). After completing reception of the frame, STA1 220 is switched back to the sleep state and operates in the sleep state.

When the AP 210 transmits the beacon frame for the second time, the medium is in the busy state in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy state, the AP 210 transmits the beacon frame at a delayed time (S213). STA1 220 may be switched to the awake state in accordance with the beacon interval and acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and switch back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it has failed to acquire information indicating presence of buffered traffic for STA1 220 through the previous two operations of reception of the TIM element. Alternatively, provided that signaling information for adjustment of the value of the wakeup interval of STA1 220 is contained in the beacon frame transmitted by the AP 210, the wakeup interval value of the STA1 220 may be adjusted. In this example, STA1 220 may be set to be switched to the awake state once at every three beacon intervals to receive a TIM element, rather than being set to be switched between the operating states at every beacon interval. Therefore, when the AP 210 fifthly transmits the beacon frame (S215)

after the fourth transmission of the beacon frame (S214), STA1 220 remains in the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set for STA2 230 may have a longer period than the wakeup interval of STA1 220. Accordingly, STA2 230 is switched to the awake state at a time point (S215) when the AP 210 fifthly transmits the beacon frame, such that the STA2 230 may receive the TIM element (S241). STA2 230 may recognize presence of a frame to be transmitted thereto through the TIM element and transmit the PS-Poll frame to the AP 210 in order to request frame transmission (S241a). The AP 210 may transmit a frame to STA2 230 in response to the PS-Poll frame (S233).

In order to operate/manage the PS mode as shown in FIG. 9, the TIM element includes a TIM indicating presence or absence of a frame to be transmitted to the STA or a DTIM indicating presence or absence of a broadcast/multicast frame. The DTIM may be implemented through field setting for the TIM element.

Figure 10:
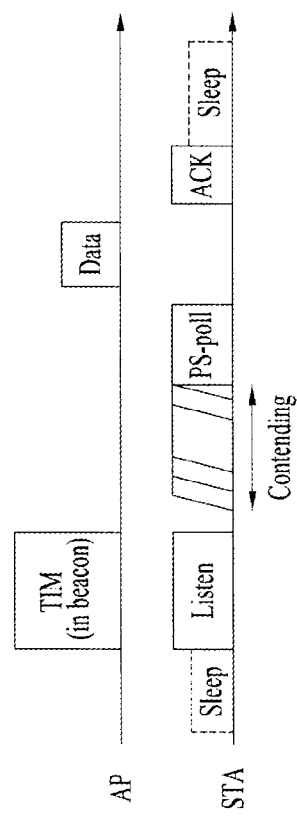
FIGS. 10 to 12 illustrate operations of a station (STA) having received a TIM in detail.
Figure 11:
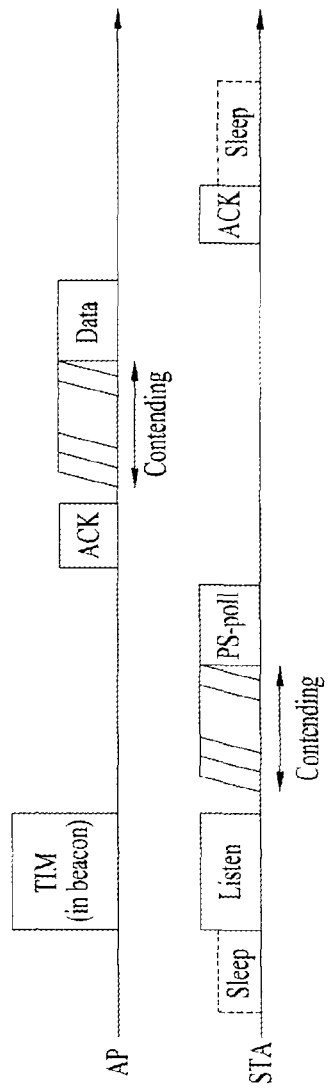
Figure 12:
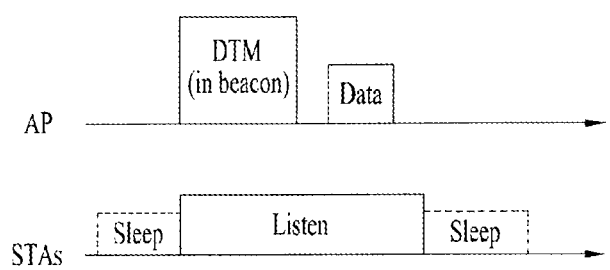

FIGS. 10 to 12 illustrate operations of an STA having received a TIM in detail.

Referring to FIG. 10, an STA is switched from the sleep state to the awake state to receive the beacon frame including a TIM from the AP. The STA may recognize presence of buffered traffic to be transmitted thereto by interpreting the received TIM element. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit a data frame to the STA. The STA may receive the data frame and transmit an ACK frame to the AP in response to the received data frame. Thereafter, the STA may switch back to the sleep state.

As shown in FIG. 10, the AP may operate in a manner of immediate response in which the AP transmits the data frame when a predetermined time (e.g., a short inter-frame space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 11.

In the example of FIG. 11, the operations of the STA of switching from the sleep state to the awake state, receiving a TIM from the AP, and transmitting the PS-Poll frame to the AP through contention are identical to those in the example of FIG. 10. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 12 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

TIM Structure

In the operation and management method of the power save (PS) mode based on the TIM (or DTIM) protocol illustrated in FIGS. 9 to 12, STAs may determine presence or absence of a data frame to be transmitted thereto through STA identification information contained in the TIM element. STA identification information may be specific information associated with an association identifier (AID) to be allocated when an STA is associated with an AP.

The AID is used as a unique ID of each STA within a BSS. For example, in the current WLAN system, an AID may be assigned a value between 1 and 2007. In the currently defined WLAN system, 14 bits for the AID may be allocated to a frame transmitted by an AP and/or an STA. Although the AID may be assigned any value up to 16383, values from 2008 to 16383 are set as reserved values.

The TIM element according to legacy definition is inappropriate for M2M application in which a large number of STAs (e.g., at least 2007 STAs) are associated with one AP. If the conventional TIM structure is extended without any change, the TIM bitmap size may excessively increase. Accordingly, it may be impossible to support the extended TIM structure using the legacy frame format, and the extended TIM structure is inappropriate for M2M communications in which application of a low transfer rate is considered. In addition, it is expected that the number of STAs having a reception data frame during one beacon period is very small. Therefore, in view of the aforementioned exemplary application of M2M communication, it is expected that a TIM bitmap will have a large size with most bits set to zero (0) in many cases. Therefore, there is a need for a technology capable of efficiently compressing a bitmap.

In the legacy bitmap compression technology, a series of 0s is omitted from the front part of a bitmap to define an offset (or start point) value. However, compression efficiency is not high in the case in which the number of STAs including a buffered frame is small, but there is a great difference between AID values of the STAs. For example, in the case in which a frame to be transmitted only to STAs whose AIDs are set to 10 and 2000 is buffered, the length of the compressed bitmap is 1990, but all the parts of the bit map other than both end parts are set to zero (0). If the number of STAs associated with one AP is small, inefficiency of bitmap compression may not be a serious problem. However, if the number of STAs associated with one AP increases, such inefficiency may deteriorate overall system performance.

In order to address this issue, AIDs may be divided into a plurality of groups such that data can be more efficiently transmitted with the AIDs. A designated group ID (GID) is allocated to each group. Hereinafter, AIDs allocated on the group basis will be described with reference to FIG. 20.

FIG. 13(a) is a diagram illustrating an exemplary AID allocated on the group basis. In FIG. 13(a), some bits located at the front part of the AID bitmap may be used to indicate a group ID (GID). For example, the first two bits of an AID bitmap may be used to designate four GIDs. If the total length of the AID bitmap is N bits, the first two bits (B1 and B2) may represent a GID of a corresponding AID.

FIG. 13(b) is a diagram illustrating another exemplary AID allocated on the group basis. In FIG. 13(b), a GID may be allocated according to the position of an AID. In this case, AIDs having the same GID may be represented by an offset and a length value. For example, if GID 1 is denoted by an offset A and a length B, this means that AIDs A to A+B−1 on a bitmap are set to GID 1. For example, FIG. 13(b) assumes that AIDs 1 to N4 are divided into four groups. In this case, AIDs belonging to GID 1 are denoted by 1 to N1, and may be represented by an offset of 1 and a length of N1. AIDs belonging to GID 2 may be represented by an offset of N1+1 and a length of N2−N1+1, AIDs belonging to GID 3 may be represented by an offset of N2+1 and a length of N3−N2+1, and AIDs belonging to GID 4 may be represented by an offset of N3+1 and a length of N4−N3+1.

If AIDs allocated on the group basis are introduced, channel access may be allowed in different time intervals according to GIDs. Thereby, the problem of lack of TIM elements for a large number of STAs may be solved and at the same time data transmission/reception may be efficiently performed. For example, in a specific time interval, channel access is allowed only for STA(s) corresponding to a specific group, and channel access of the remaining STA(s) may be restricted. A predetermined time interval in which only specific STA(s) are allowed to perform channel access may be referred to as a restricted access window (RAW).

Hereinafter, channel access based on GIDs will be described with reference to FIG. 13(c). FIG. 13(c) illustrates an exemplary channel access mechanism according to beacon intervals with AIDs divided into three groups. A first beacon interval (or a first RAW) is an interval in which channel access of an STA corresponding to an AID belonging to GID 1 is allowed, and channel access of STAs belonging to the other GIDs is not allowed. To implement this mechanism, a TIM element used only for AIDs corresponding to GID 1 is contained in a first beacon frame. A TIM element used only for AIDs corresponding to GID 2 is contained in a second beacon frame. Accordingly, channel access is allowed only for an STA corresponding to the AIDs belonging to GID 2 in a second beacon interval (or a second RAW). A TIM element used only for AIDs corresponding to GID 3 is contained in a third beacon frame. Accordingly, channel access is allowed only for an STA corresponding to the AIDs belonging GID 3 in a third beacon interval (or a third RAW). A TIM element used only for AIDs corresponding GID 1 is contained in a fourth beacon frame. Accordingly, channel access is allowed only for an STA corresponding to the AIDs belonging to GID 1 in a fourth beacon interval (or a fourth RAW). Thereafter, only channel access of an STA corresponding to a specific group indicated by the TIM contained in a corresponding beacon frame may be allowed in each of beacon intervals subsequent to the fifth beacon interval (or in each of RAWs subsequent to the fifth RAW).

While FIG. 13(c) exemplarily shows a case in which the order of allowed GIDs is cyclic or periodic according to the beacon intervals, embodiments of the present invention are not limited thereto. That is, only AID(s) belonging to specific GID(s) may be contained in a TIM element, such that only channel access of STA(s) corresponding to the specific AID(s) is allowed in a specific time interval (for example, a specific RAW), and channel access of the other STA(s) is not allowed.

The aforementioned group-based AID allocation scheme may also be referred to as a hierarchical structure of a TIM.

That is, the entirety of an AID space may be divided into a plurality of blocks, and only STA(s) (i.e., STA(s) of a specific group) corresponding to a specific block having a value other than '0' may be allowed to perform channel access. Thereby, a large-sized TIM is divided into small-sized blocks/groups, an STA can easily maintain TIM information, and blocks/groups may be easily managed according to class, QoS or usage of the STA. While FIG. 13 exemplarily shows a 2-level hierarchy, a hierarchical TIM structure comprised of two or more levels may be configured. For example, the whole AID space may be divided into a plurality of page groups, each page group may be divided into a plurality of blocks, and each block may be divided into a plurality of sub-blocks. In this case, an extended version of the example of FIG. 13(a) may be configured such that first N1 bits in an AID bitmap represent a page ID (PID), the next N2 bits represent a block ID, the next N3 bits represent a sub-block ID, and the remaining bits represent the position of STA bits within a sub-block.

Various schemes for dividing STAs (or AIDs allocated to the STAs) into predetermined hierarchical group units and managing the same may be applied to the examples of the present invention disclosed below. However, the group-based AID allocation schemes are not limited to these examples.

Improved Channel Access Method

To improve the channel access operation of an STA in a WLAN system, the present invention proposes a method for efficiently supporting STAs that receive data from an AP without TIM signaling.

Figure 14:
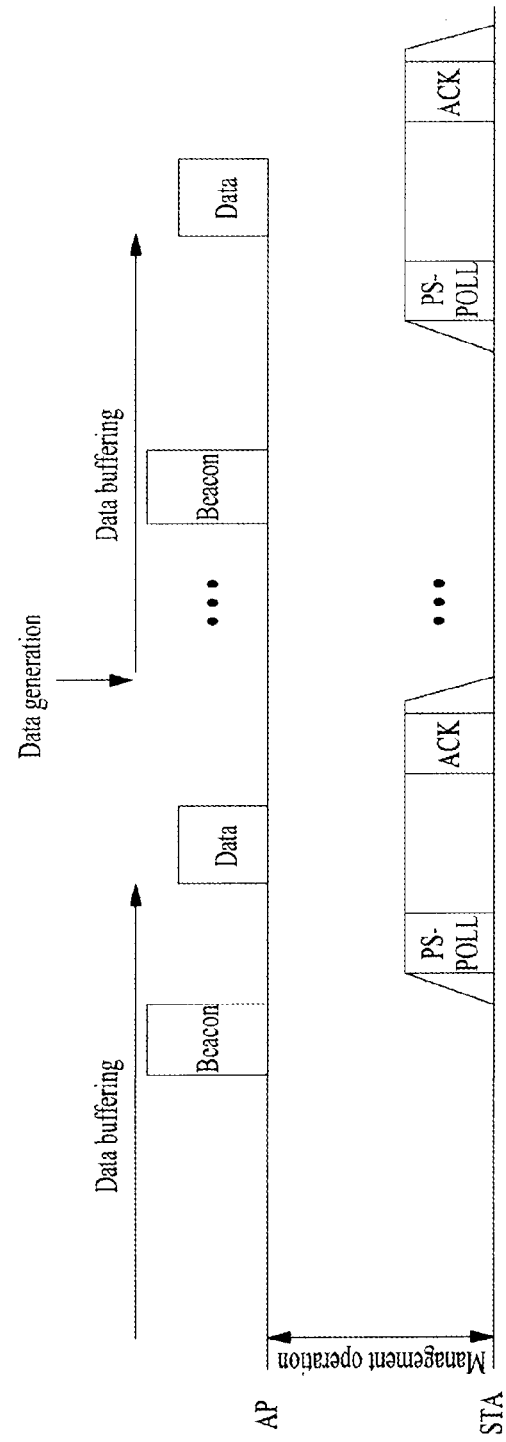
FIG. 14 illustrates a channel access mechanism of a non-TIM STA.

FIG. 14 illustrates a channel access mechanism of a non-TIM STA.

As shown in FIG. 14, an STA may inform an AP of presence thereof through a management operation including an association process or a negotiation process, and also of preference for downlink transmission. For example, indicating and checking such information may be performed through an association request/response process or a probe request/response process between the STA and the AP.

Preference of the STA for downlink transmission may include one of a scheme in which the STA recognizes presence or absence of downlink data through TIM and receives the downlink data and a scheme in which the STA receives the downlink data without depending on the TIM. For example, a meter or sensor type STA (hereinafter, referred to as an S-STA) may be assumed to stay in the sleep mode for a long time over a fixed period (e.g., one month) according to the properties of an application (e.g., a gas metering report) and then wake up for a short time to perform channel access, in order to minimize power consumption.

One purpose of the AP providing the STA with the TIM information is to enhance resource use efficiency by allowing the STA to perform channel access only on the time resources indicated through the TIM. However, since the downlink data for the S-STA described above exists only for a very short time, signaling overhead according to transmission of the TIM information from the AP to the S-STA in each beacon may result in inefficient use of network resources. Accordingly, the AP may rarely need to inform the S-STA of the data buffering status with a risk of causing overhead of TIM signaling. A mode in which the S-STA operates without an indication from the TIM may be referred to as a non-TIM mode, and a mode in which the S-STA operates according to an indication from the TIM may be referred to as a TIM mode.

As shown in FIG. 14, in the case of a non-TIM STA, the AP stores downlink data to be transmitted to the STA until it receives PS-Poll from the STA. Since the non-TIM STA can transmit PS-Poll without being restricted by the TIM, it may transmit the PS-Poll to the AP at an arbitrary time. When the AP receives the PS-Poll from the non-TIM STA, it may transmits the stored downlink data for the STA to the STA and receive an ACK frame from the STA.

Since the AP cannot pre-recognize the time at which an S-STA (or a non-TIM STA) will transmit a PS-Poll, the AP needs to prepare and store downlink data from the time at which the AP receives preference information about TIM signaling (e.g., information indicating that the PS-Poll operation will be performed without the TIM signaling) in the process of negotiation/association with the S-STA or from the time at which the downlink data for the S-STA is produced until the downlink data is transmitted to the S-STA. In the case in which a large number of S-STAs access a channel according to various types and periods, buffering and/or managing all the data for the S-STAs may be very demanding for a system or the AP even if the amount of data for each S-STA is not large.

Accordingly, to address such inefficiency, the present invention proposes a new channel access method (specifically, a new PS-Poll mechanism) for S-STAs (or non-TIM STAs).

Embodiment 1

In the proposed method of this embodiment, a PS-Poll transmission time and/or transmission period of an S-STA (or a non-TIM STA) is preset, and an AP manages downlink data based on the transmission time and/or transmission period information. Thereby, the burden on the AP which needs to maintain data for S-STAs for a long time may be lessened, and the buffer/memory resources of the AP may be more efficiently used.

Figure 15:
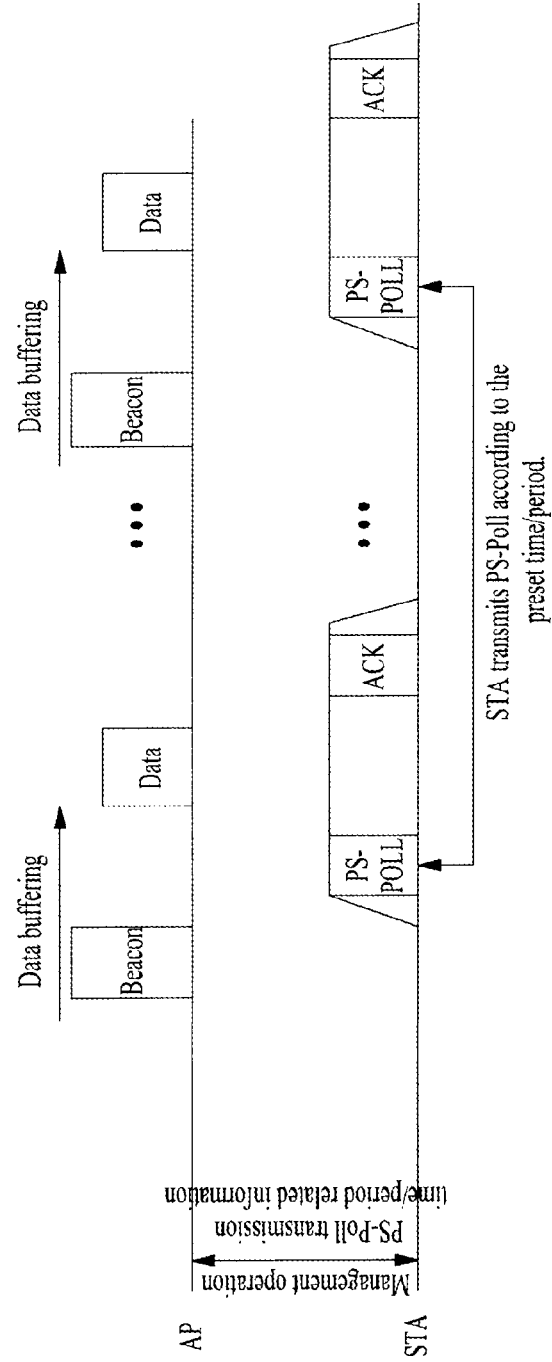
FIG. 15 illustrates an improved channel access mechanism according to one embodiment of the present invention.

FIG. 15 illustrates an improved channel access mechanism according to one embodiment of the present invention.

Referring to FIG. 15, an S-STA (or a non-TIM STA) may perform negotiation with an AP about preference for TIM signaling-based PS-Poll transmission, through a management process (e.g., an association request/response process, a probe request/response process, etc.). Herein, the S-STA may inform the AP that the S-STA will operate in a mode which is not on the basis of TIM (namely, the non-TIM mode) and additionally perform negotiation for at least one of PS-Poll transmission time and transmission period. That is, the S-STA may exchange, through a specific management frame, information about the PS-Poll transmission time and/or transmission period with the AP.

The STA may determine such information about the transmission time and/or transmission period based on the properties of an application thereof (e.g., a reporting rate and a channel access rate) and inform the AP of the information. Alternatively, the AP may determine the information based on the load and status of a network (e.g., network access load, software update periodicity, etc.) and inform the S-STA of the information.

The information about the PS-Poll transmission time and/or transmission period which one of the S-STA and the AP sends to the other one may be modified (updated) and returned by the other one. For example, if the S-STA determines the information about the PS-Poll transmission time and/or transmission period and sends the same to the AP through a predetermined request frame, the AP may produce the information or modified information in consideration of network load and the like and send the same to the STA through a predetermined response frame. Alternatively, if the information about the PS-Poll transmission time and/or transmission period that the AP determines is delivered to the S-STA through a predetermined request frame, the S-STA may produce modified information based on the properties of the application thereof and send the same to the AP through a predetermined response frame.

In the case in which a PS-Poll transmission-enabled time and/or period is preset between the AP and the STA as above, the STA may transmit PS-Poll to the AP according to the PS-Poll transmission-enabled time and/or period. In this case, since the STA needs to perform contention for a medium in order to transmit the PS-Poll, transmission should be understood simply as being attempted at the corresponding time. That is, transmission/reception of the PS-Poll may not be performed exactly at the preset transmission time/period. Hereinafter, description will be given of operations of the AP and the STA performed in the case in which a PS-Poll transmission-enabled (or transmission-allowed) time/period is preset.

The AP may prepare data before the preset PS-Poll transmission-enabled time of an STA (e.g., an S-STA or a non-TIM STA) and transmit, upon successfully receiving PS-Poll from the STA, the prepared data to the STA. Since the PS-Poll is not received from the AP exactly at the PS-Poll transmission-enabled time due to medium contention for PS-Poll transmission, the AP may prepare the data with a time margin in consideration of contention. In addition, the time taken for the AP to prepare the data may include a time taken to receive, from a server, data to be transmitted to the STA and buffer the data. If the AP having received PS-Poll from the STA cannot immediately transmit data due to insufficient time for preparation of the data, the AP may transmit an ACK frame for the PS-Poll first and then transmit the data to the STA later through contention (see FIG. 11). According to the proposed method, the AP does not continue to buffer data after the process of association/negotiation with the STA. Rather, the AP may prepare and buffer data by a preset target time before the data is requested. Thereby, the burden on the AP is lessened.

An STA (e.g., an S-STA or a non-TIM STA) may transmit PS-Poll to the AP through contention according to a preset PS-Poll transmission-enabled time/period. The S-STA, which is often in the sleep (or doze) mode on a long period, may wake up according to the preset PS-Poll transmission-enabled time/period to transmit PS-Poll to the AP through contention. In this view, the PS-Poll transmission-enabled time of the STA may correspond to a target wake time of the STA.

As described above, if the medium remains occupied by another STA, the STA may continue to fail in PS-Poll transmission even if it wakes up at the preset time and attempts PS-Poll transmission. Particularly, in the case in which the STA transmits PS-Poll without depending on the TIM, it is possible that the medium is occupied by another STA at the preset PS-Poll transmission-enabled time even if the STA operates according to this time. Accordingly, if the STA is allowed to limitlessly attempt PS-Poll transmission whenever transmission fails, a problem such as excessive power consumption of the STA may occur.

To address such problem, the present invention proposes defining and using a specific timer (e.g., a PS-Poll transmission-enabling timer or a channel access-allowed timer) related to PS-Poll transmission or channel access from an STA (e.g., an S-STA or a non-TIM STA). The specific timer may be defined as running in a predetermined interval between the aforementioned PS-Poll transmission-enabled time and a predetermined boundary time. While the specific timer is running, the STA is allowed to attempt transmission of PS-Poll and the AP can expect PS-Poll transmission from the STA. That is, the PS-Poll transmission time may be understood as defining (restricting) a time window (or time interval) in which the STA is allowed to perform transmission of PS-Poll (i.e., channel access), rather than as defining a fixed time. Thereby, the STA may perform PS-Poll transmission (or channel access) based on contention in an interval defined by the PS-Poll transmission-enabled time and the timer.

Such timer may be set in both the AP and the STA.

In addition, the STA may enter the doze state when the timer starting at the preset PS-Poll transmission time expires, and may wake up at the next PS-Poll transmission-enabled time (or the next transmission-enabled time determined based on the PS-Poll transmission period) and attempt PS-Poll transmission in the time interval.

Meanwhile, the AP having data prepared and buffered for the STA at (or before) the preset PS-Poll transmission time may discard the data when the timer having started at the PS-Poll transmission time expires.

If the wakeup period of the STA is very long, the STA may operate in the doze mode for a long time without listening to a beacon from the AP, and accordingly timing may not be synchronized between the AP and the STA due to a problem such as clock drift. When a timing reference of the AP is different from that of the STA as above, the STA may transmit PS-Poll to the AP considering that the PS-Poll transmission thereof is allowed, but it may fail to correctly receive data since the time window has already expired and thus the AP has discarded data. That is, if the PS-Poll transmission-allowed time window of the STA is strictly applied, the STA may fail to correctly perform channel access or data transmission/reception. Accordingly, the STA may be allowed to perform PS-Poll transmission at a certain time even after the timer defining the PS-Poll transmission-enabling time window expires. In addition, in the case that the wakeup period of the STA is very long, the AP may maintain the data for the STA rather than discarding the data even when the timer expires since there may be PS-Poll transmission from the STA after expiration of the timer. The scheme of allowing PS-Poll transmission from the STA even after expiration of the timer as above may be understood as a scheme independent of setting the PS-Poll transmission (or channel access)-allowed time window of the STA defined (or restricted) according to the PS-Poll transmission time (or wakeup time) and the specific timer or as an exceptional case.

The AP and the STA may preset the length of the time window in which the PS-Poll transmission (or channel access) is allowed or the timer through a management operation including a negotiation/association process.

Embodiment 2

In this embodiment, a method for separately setting a time window allowing channel access (or PS-Poll transmission) of an S-STA (or a non-TIM STA) therein and a time window allowing channel access (or PS-Poll transmission) of a different type STA (or a TIM STA) is proposed. Thereby, channel access such as PS-Poll transmission/reception from the S-STA (or the non-TIM STA) may be reliably ensured.

Figure 16:
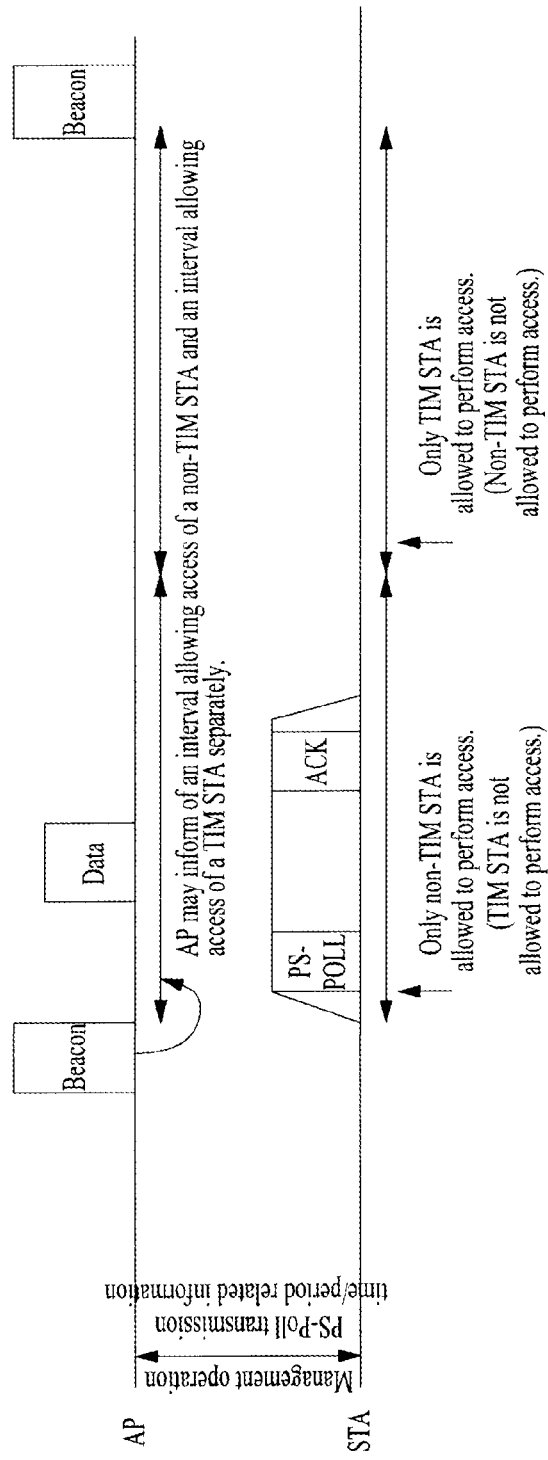
FIG. 16 illustrates an improved channel access mechanism according to another embodiment of the present invention.

FIG. 16 illustrates an improved channel access mechanism according to another embodiment of the present invention.

As shown in FIG. 16, in the case in which PS-Poll transmission (or channel access)-allowed time of the S-STA (or the non-TIM STA) is included in a specific beacon interval (a time window between two consecutive beacons), the AP may transmit, to STAs, information about separate setting of a PS-Poll transmission (or channel access)-allowed time window for the S-STA (or the non-TIM STA) and a PS-Poll transmission (or channel access)-allowed time window for a different type STA (or a TIM STA) through a beacon signal. Together with or independently of this operation, in the step of the management operation performed between the AP and the STAs through association request/response, negotiation request/response, and probe request/response frames, the AP may inform each STA of the information about separate time window setting by which a specific time window in each beacon interval is restricted to the PS-Poll transmission (or channel access)-allowed interval of the S-STA (or the non-TIM STA) and another time window is restricted to the PS-Poll transmission (or channel access)-allowed interval of a different type STA (or a TIM STA).

Herein, separate time window setting refers to setting time windows such that an S-STA (or a non-TIM STA) and a different type STA (or a TIM STA) are not allowed to perform channel access in the same time window. In other words, time windows may be set such that channel access of the S-STA (or the non-TIM STA) is allowed but channel access of the different type STA (or the TIM STA) is not allowed in a specific time window, while channel access of the S-STA (or the non-TIM STA) is not allowed but channel access of the different type STA (or the TIM STA) is allowed in another time window.

Information about separate time window setting may include, for example, at least one of an indication informing the TIM STA of a time window in which channel access thereof is not allowed, an indication informing the TIM STA of a time window in which channel access thereof is allowed, an indication informing the non-TIM STA of a time window in which channel access thereof is not allowed, and an indication informing the non-TIM STA of a time window in which channel access thereof is allowed.

In the case in which a time window is set such that channel access of a first type STA (e.g., an S-STA, or a non-TIM STA) is allowed, but channel access of a second type STA (e.g., a different type STA other than the S-STA or a TIM STA) is not allowed in the time window, the AP may inform a specific STA of the time and period (interval) information about the time window and also inform the STA that PS-Poll (or channel access) of the specific STA is allowed or not allowed within the time window set according to the time and period information. For example, second type STAs may be informed, through the management operation including a negotiation/association process, that channel access is not allowed in a time window for a first type STA (or channel access is allowed in the time windows other than the time window for the first type STA within a specific beacon interval).

Informing STAs of a time, a timer (or the length of a time interval), and/or the position of a specific time window in the time domain within which only channel access (or PS-Poll transmission) of the proposed specific type STA is allowed may be pre-configured through the management operation including the negotiation/association process between the AP and the STAs.

Figure 17:
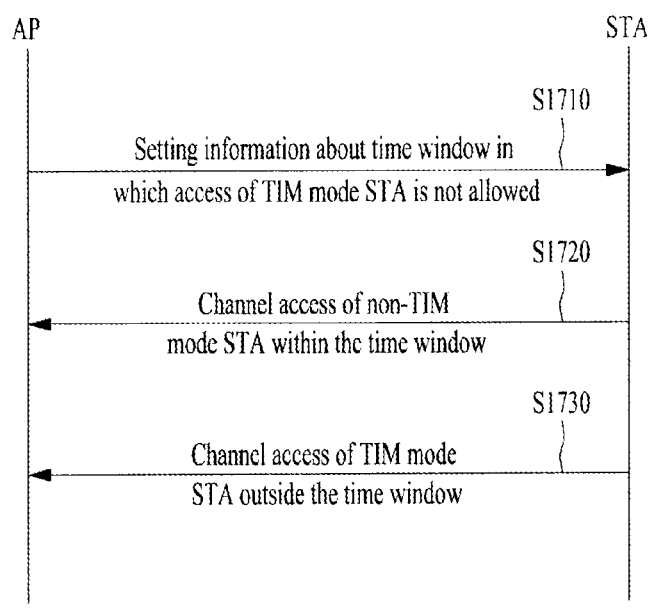
FIG. 17 illustrates a channel access method according to one embodiment of the present invention.

FIG. 17 illustrates a channel access method according to one embodiment of the present invention.

In step S1710, the AP may provide one or more STAs with setting information about time windows within which access of a TIM mode STA is not allowed (or only access of a non-TIM mode STA is allowed). The time window may be periodically set. In addition, the time window may be specified by a start time and a time interval (or a timer).

In step S1720, if the STA is a non-TIM mode STA, the STA may perform channel access (e.g., PS-Poll transmission) within the time window. For example, if the non-TIM mode STA is an STA such as an S-STA that operates according to a long sleep period, the STA may wake up and perform channel access at the start time of the time window. Accordingly, the time window may be viewed as a window restrictively allowing only access of the non-TIM mode STA. The AP may buffer data for the non-TIM mode STA before the time window to allow channel access of the STA, or discard the data after expiration of the time window.

In step S1730, in the case of a TIM mode STA, the STA may perform channel access in a time interval which is indicated by a TIM for the STA and is out of the time window.

Regarding the channel access method illustrated in FIG. 17, details of the various embodiments of the present invention described above may be independently applied or two or more embodiments may be simultaneously applied.

Embodiment 3

An STA may define a listening interval and inform the AP of the defined listening interval information in order to inform of how often the STA in the power save mode will wake up and listen to a beacon management frame from the AP. The STA in the power save mode may periodically wake up using the defined listening interval, receive, in the awake state, a beacon management frame from the AP, and check TIM signaling. The listening interval of the STA in the power save mode may need to be set depending on the transmission period of the beacon frame (for example, such that the listening interval becomes a multiple of the beacon interval). Operation of the STA in the power save mode performed according to the set listening interval may be differently defined depending on a mode (TIM mode) in which TIM signaling is checked and the other mode (non-TIM mode) in which TIM signaling is not checked. Unlike an STA (e.g., a TIM STA) that periodically receives a beacon according to the listening interval, an STA (e.g., a non-TIM STA or an S-STA) operating in the non-TIM mode need not periodically receive a beacon signal.

Specifically, while an STA operating in the TIM mode may be configured to receive a beacon frame in the listening interval, an STA operating in the non-TIM mode may be configured to perform channel access (e.g., transmission of a PS-Poll frame) in the listening interval. That is, operation of an STA in the power save mode in the listening interval thereof may be differently configured depending on the operation mode of the STA.

In this embodiment, there is proposed an improved channel access mechanism in which a non-TIM STA transmits at least one PS-Poll (or a trigger frame) per listening interval rather than receiving a beacon frame to perform channel access.

Figure 18:
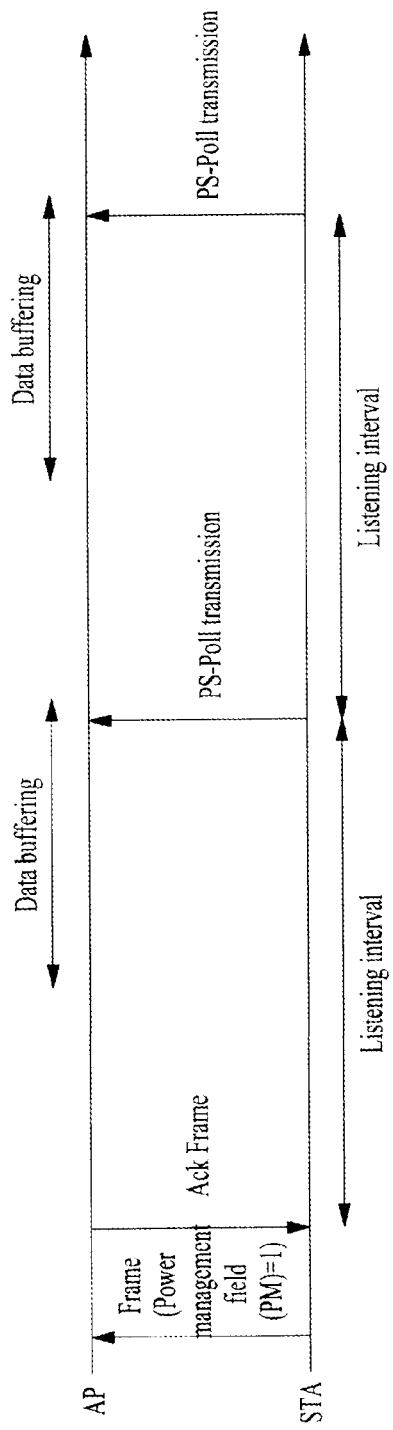
FIG. 18 illustrates an improved channel access mechanism using a listening interval according to one embodiment of the present invention.

FIG. 18 illustrates an improved channel access mechanism using a listening interval according to one embodiment of the present invention.

An STA (e.g., an S-STA or a non-TIM STA) that does not check TIM signaling may set a time to inform the AP of switching to the power management mode or a time to receive a response to informing of switching to the power management mode as the start time of the listening interval. For example, the STA may set the time to transmit a frame having an index of the power management (PM) field set to 1 or the time to receive an ACK frame in response to the frame as the start point of the listening interval (FIG. 18 illustrates a case in which the time to receive the ACK frame is set as the start point of the listening interval).

The AP and the STA may set the start point of the listening interval in consideration of delay of transmission and processing caused in frame transmission/reception.

The STA (e.g., an S-STA or a non-TIM STA) may wake up and perform channel access (e.g., transmission of PS-Poll) to the AP according to the listening interval. If the STA is a non-TIM STA or an S-STA, the STA needs not receive a beacon frame in the listening interval. Instead of receiving a beacon frame, the STA may perform channel access by transmitting at least one PS-Poll (or trigger frame) in every listening interval.

Similar to the STA, the AP may buffer data according to the listening interval between a specific time and a time at which the STA transmits a PS-Poll, and transmit, if the PS-Poll is successfully received, the buffered data to the STA. If the AP fails to receive the PS-Poll from the STA at the time to receive the PS-Poll, the AP may discard the buffered data when a predetermined time elapses. Herein, the predetermined time may be a value obtained from pre-negotiation between the STA and the AP through a management procedure, or may be determined based on a parameter and a specific time pre-defined by the system. In addition, the start time of data buffering of the AP may be a time at which data to be transmitted to the STA is received from an outside source such as a server. The time for the AP to buffer or discard data may be set to a value associated with the listening interval of the STA. For example it may be set to a value having the same periodicity as the listening interval and periodically used.

The STA may be configured to transmit PS-Poll at a specific time according to the listening interval. For example, the STA may perform channel access at each of specific times repeated at the listening intervals as shown in FIG. 18.

As discussed in Embodiment 1, an STA is not always allowed to transmit PS-Poll exactly at the time to perform transmission due to contention for the medium. Thereby, the AP may discard buffered data and thus fail to transmit the data to the STA if the STA transmits PS-Poll at a delayed time, not at the exact transmission-enabled time. In this case, the transmission time for the next PS-Poll may be determined to be a time passing, by a listening interval, the time at which the PS-Poll should have been transmitted, not the time at which the PS-Poll has actually been transmitted. That is, even if delay of PS-Poll transmission occurs, the STA may transmit the PS-Poll again according to the preset listening interval without considering the delay. A specific example of this case is illustrated in FIG. 19.

Figure 19:
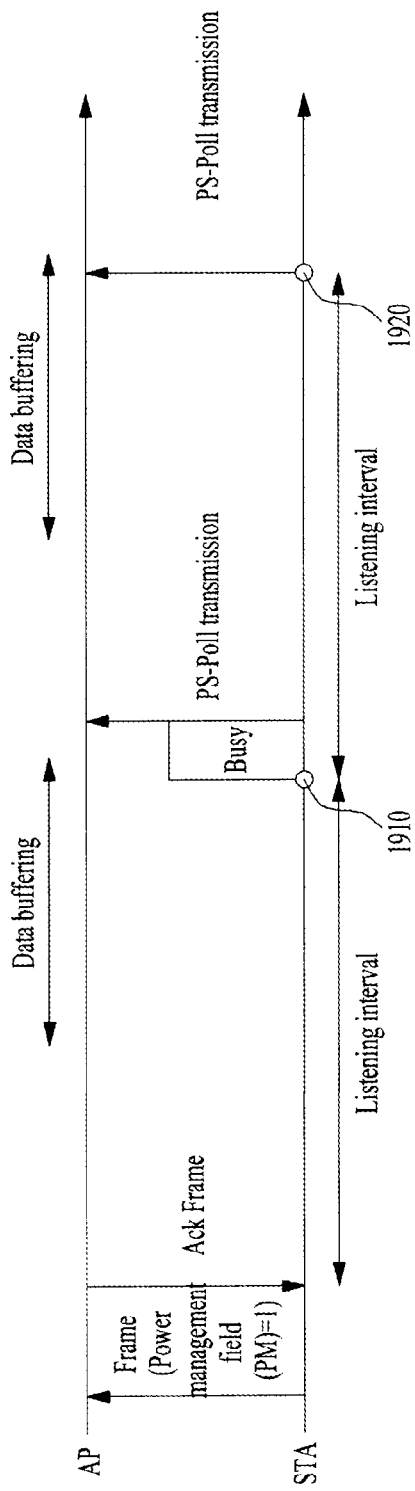
FIG. 19 illustrates transmission time of a next PS-Poll according to one embodiment of the present invention.

FIG. 19 illustrates transmission time of a next PS-Poll according to one embodiment of the present invention. As shown in FIG. 19, even if the STA transmits PS-Poll not at the exact transmission time (a first time) 1910 but at the delayed time (a second time) 1920 due to the busy state of the medium, the transmission time for the next PS-Poll is a time passing the first time by the listening interval, not a time passing the second time by the listening interval.

In the case in which the STA fails to transmit PS-Poll at the time at which the STA desires to transmit the PS-Poll due to repeated occurrence of the busy state of the medium, or the STA repeatedly fails to receive data even if it has transmitted the PS-Poll, the STA may transmit the next PS-Poll to the AP at a prior time to a set time for transmission of the next PS-Poll. Herein, the prior time may be preset through a system parameter or may be set through a pre-management procedure between the STA and the AP. The AP continues to perform the operations of buffering and discarding data according to the preset listening interval.

The above embodiment and FIGS. 18 and 19 do not define an STA as attempting channel access only at a specific time corresponding to a listening interval. The STA according to this embodiment may be understood as being capable of basically attempting channel access (e.g., transmission of PS-Poll) in an interval which does not extend beyond an interval boundary of a determined listening interval. That is, the STA may attempt channel access (e.g., transmission of PS-Poll) to the AP at least once per listening interval.

Figure 20:
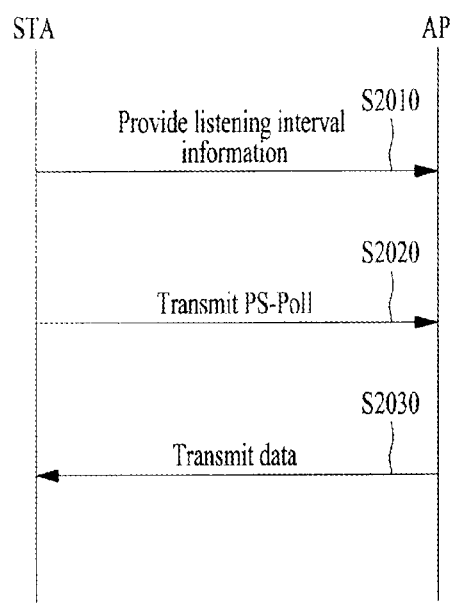
FIG. 20 illustrates a channel access method according to one embodiment of the present invention.

FIG. 20 illustrates a channel access method according to one embodiment of the present invention.

In step S2010, an STA may provide the AP with listening interval information indicating a channel access interval. At this time, the start point of the listening interval may be determined to be either a time at which the STA informs the AP of switching to the power management mode or a time at which the STA receives ACK in response to informing of switching to the power management mode. In step S2020, the STA may perform channel access (e.g., PS-Poll transmission) to the AP according to the listening interval. The AP may buffer data for the STA before a channel access-expected time in order to allow channel access of the STA, and may discard the data when a predetermined time passes after the channel access-expected time.

Regarding the channel access method illustrated in FIG. 20, details of the various embodiments of the present invention described above may be independently applied or two or more embodiments may be simultaneously applied.

Embodiment 4

While channel access is illustrated as being attempted in the listening interval in Embodiment 3, improved interval information may be used in place of the listening interval on behalf of STAs for power savings. For example, the listening interval may be replaced with improved interval information such as a polling interval and a maximum idle period for the STAs for power savings. The interval information such as the polling interval and the maximum idle period may be used as interval/period information indicating how often the STA needs to transmit PS-Poll to check an indication of a buffered frame of the AP Accordingly, while Embodiment 3 is illustrated as being implemented using listening interval information, it may also be implemented using the improved interval information in place of the listening interval information.

In the case in which the improved interval information distinguished from the listening interval information is defined and used, an STA may inform the AP, through Bit Indication of the conventional interval information field, that the STA does not listen to a beacon. For example, the STA may set all the bits of a listening interval field having a length of 2 octets to 0 or 1 to inform the AP that the STA does not listen to the beacon.

Figure 21:
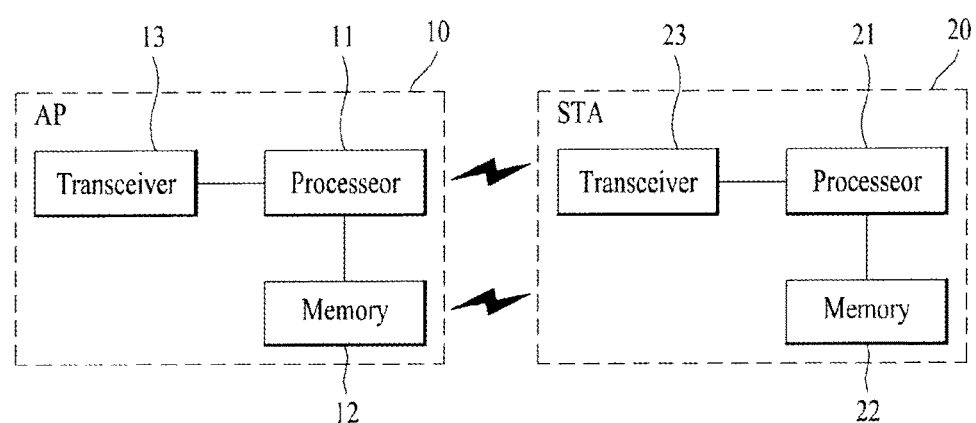
FIG. 21 is a block diagram illustrating a radio frequency apparatus according to one embodiment of the present invention.

FIG. 21 is a block diagram illustrating a radio frequency device according to one embodiment of the present invention.

An AP 10 may include a processor 11, a memory 12, and a transceiver 13. An STA 20 may include a processor 21, a memory 22, and a transceiver 23. The transceivers 13 and 23 may transmit/receive a radio frequency signal and implement a physical layer according to an IEEE 802 system. The processors 11 and 21 may be connected to the transceivers 13 and 21 to implement a physical layer and/or a MAC layer according to an IEEE 802 system. The processors 11 and 21 may be configured to perform various operations according to the various embodiments of the present invention described above. In addition, modules to perform operations of an AP and an STA according to the various embodiments of the present invention described above may be stored in the memories 12 and 22 and executed by the processors 11 and 21. The memories 12 and 22 may be contained in the processors 11 and 21 or may be installed at the exterior of the processors 11 and 21 and connected to the processors 11 and 21 by a well-known means.

Constituents of the AP and the STA may be provided such that details of the various embodiments of the present invention described above are independently employed or two or more embodiments are simultaneously implemented. For clarity, redundant descriptions have been omitted.

The embodiments of the present invention described above may be implemented by various means. For example, the embodiments of the present invention may be implemented by hardware, firmware, software, or a combination thereof.

When implemented by hardware, a method according to embodiments of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodied in firmware or software, a method according to the embodiments of the present invention may be implemented in the form of a module, a procedure, a function, or the like which performs the functions or operations described above. Software code may be stored in a memory unit and executed by the processor. The memory unit may be disposed inside or outside the processor to transceive data with the processor through various well-known means.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention without departing from the spirit and scope of the present invention. Thus, the present invention is not intended to be limited to the embodiments described herein, but is intended to have the widest scope consistent with the principles and novel features disclosed herein.

INDUSTRIAL APPLICABILITY

As described above, various embodiments of the present invention have been described through examples applied to an IEEE 802.11 system, but they may also be applied to various wireless communication systems in the same manner.

The invention claimed is:
1. A method for performing channel access in a station (STA) in a wireless communication system, comprising:

transmitting listening interval information to an access point (AP)
wherein the listening interval is a period that a power save STA wakes up and listens to a beacon frame from an access point (AP),
performing the channel access based on a mode of the STA,
wherein the beacon frame including a traffic indication map (TIM) element is received during the listening interval when the STA is in a TIM mode,
wherein a power save (PS)-Poll for channel access is received by the AP during the listening interval when the STA is in a non-TIM mode,
wherein the STA in the non-TIM mode transmits the PS-Poll without receiving the beacon frame including the TIM element from the AP during every listening interval.

2. The method according to claim 1, wherein a start time of the listening interval is one of a time for the STA to transmit power management mode setting information to the AP and a time for the STA to receive a response frame in response to the setting information.

3. The method according to claim 1, wherein the STA comprises a sensor type STA.

4. The method according to claim 1, wherein the STA in the non-TIM mode transmits the PS-Poll during every listening interval until the transmission of the PS-Poll is successful,
wherein, if the transmission of the PS-Poll continuously fails in a predetermined number of listening intervals, the STA transmits the PS-Poll between the end of a first listening interval and the start of a second listening interval,
wherein the first listening interval is the last listening interval where the transmission of the PS-Poll has failed, and
wherein the second listening interval is a next listening interval after the first listening interval.

5. The method according to claim 4, wherein the prior time is a value set through a system parameter or a value preset through a management process between the STA and the AP.

6. The method according to claim 1, wherein, even if the transmission of the PS-Poll is performed at a second time later than a first time of the listening interval, a transmission time of a next PS-Poll is estimated from the first time rather than from the second time.

7. A station (STA) for performing channel access in a wireless communication system comprising:
a transceiver; and
a processor configured to control the transceiver,
wherein the processor further:
transmits listening interval information to an access point (AP),
wherein the listening interval is a period that a power save STA wakes up and listens for a beacon frame from an access point (AP),
performs channel access based on a mode of the STA,
controls the transceiver to receive a beacon frame including a traffic indication map (TIM) element during the listening interval when the STA is in a TIM mode, and
controls the transceiver to transmit a power save (PS)-poll for channel access to the AP during the listening interval when the STA is in a non-TIM mode,
wherein the STA in the non-TIM mode transmits the PS-Poll without receiving the beacon frame including TIM element from the AP in every listening interval.

8. The STA according to claim 7, wherein the processor sets one of a time to transmit power management mode setting information to the AP and a time to receive a response frame in response to the setting information as a start time of the listening interval.

9. The STA according to claim 7, wherein the STA comprises a sensor type STA.

10. The STA according to claim 7, wherein the PS-Poll is transmitted during every listening interval in the non-TIM mode until the transmission of the PS-Poll is successful,
wherein the processor controls the transceiver to transmit the PS-Poll between the end of a first listening interval and the start of a second listening interval when the transmission of the PS-Poll continuously fails in a predetermined number of listening intervals,
wherein the first listening interval is the last listening interval where the transmission of the PS-Poll has failed, and
wherein the second listening interval is a next listening interval after the first listening interval.

11. The STA according to claim 10, wherein the prior time is a value set through a system parameter or a value preset through a management process between the STA and the AP.

12. The STA according to claim 7, wherein, even if transmission of the PS-Poll is performed at a second time later than a first time of the listening interval, the processor computes a transmission time of a next PS-Poll from the first time rather than from the second time.

* * * * *